(12) United States Patent
Marusich et al.

(10) Patent No.: US 10,462,236 B2
(45) Date of Patent: Oct. 29, 2019

(54) COORDINATING METGADATA (71) Applicant: Apple Inc., Cupertino, CA (US)

(72) Inventors: Daniel E. Marusich, San Carlos, CA (US); Gregory S. Robbin, Mountain View, CA (US); Kevin M. Britten, San Francisco, CA (US); Oliver Krevet, San Jose, CA (US); Neil Appel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 14/727,724

(22) Filed: Jun. 1, 2015

(65) Prior Publication Data
US 2016/0352797 A1 Dec. 1, 2016

(51) Int. Cl.
*H04L 29/08* (2006.01)
*H04L 29/06* (2006.01)

(52) U.S. Cl.
CPC ............ *H04L 67/18* (2013.01); *H04L 65/605* (2013.01)

(58) Field of Classification Search
CPC ...... H04L 65/607; H04L 65/601; H04L 67/18
See application file for complete search history.

(56) References Cited

U.S. PATENT DOCUMENTS

| | | | |
|---|---|---|---|
| 8,132,203 B2 | 3/2012 | de Heer | |
| 8,522,289 B2* | 8/2013 | Athsani | G06Q 30/02 707/733 |
| 8,880,712 B2 | 11/2014 | Cortes et al. | |
| 2002/0141584 A1* | 10/2002 | Razdan | G06F 21/10 380/203 |
| 2003/0188152 A1* | 10/2003 | Belknap | H04L 63/0428 713/153 |
| 2005/0132070 A1* | 6/2005 | Redlich | G06F 21/6209 709/228 |
| 2007/0156770 A1 | 7/2007 | Espelien | |
| 2007/0250863 A1* | 10/2007 | Ferguson | H04H 20/106 725/46 |
| 2008/0168523 A1* | 7/2008 | Ansari | G06Q 30/04 725/131 |
| 2008/0320545 A1* | 12/2008 | Schwartz | H04N 7/17318 725/135 |
| 2009/0063419 A1* | 3/2009 | Nurminen | G06F 16/78 |
| 2009/0089352 A1* | 4/2009 | Davis | G06Q 10/00 709/201 |
| 2009/0148124 A1* | 6/2009 | Athsani | G06Q 30/02 386/241 |
| 2009/0187826 A1* | 7/2009 | Heimbold | H04N 5/262 715/719 |
| 2009/0210899 A1* | 8/2009 | Lawrence-Apfelbaum | H04L 12/2801 725/34 |
| 2009/0217344 A1* | 8/2009 | Bellwood | G06F 21/10 726/1 |
| 2010/0153575 A1* | 6/2010 | Liu | H04L 65/605 709/231 |
| 2011/0176603 A1 | 7/2011 | Beeler et al. | |
| 2011/0197237 A1* | 8/2011 | Turner | H04N 21/2343 725/78 |

(Continued)

*Primary Examiner* — Blake J Rubin
(74) *Attorney, Agent, or Firm* — Blank Rome LLP (57) ABSTRACT

Disclosed herein are systems, methods, and non-transitory computer-readable storage media for coordinating metadata for media streaming content and for sending global metadata to client devices that can be used to request supplemental metadata specific to a media consumption experience.

15 Claims, 7 Drawing Sheets

(56) References Cited

U.S. PATENT DOCUMENTS

| | | | |
|---|---|---|---|
| 2011/0202544 A1* | 8/2011 | Carle | H04W 4/02 707/754 |
| 2011/0276396 A1* | 11/2011 | Rathod | G06Q 10/00 705/14.49 |
| 2013/0031162 A1* | 1/2013 | Willis | H04L 65/1069 709/203 |
| 2013/0080268 A1* | 3/2013 | Gordon | G06Q 30/02 705/14.73 |
| 2014/0006951 A1* | 1/2014 | Hunter | H04H 60/31 715/719 |
| 2014/0143806 A1* | 5/2014 | Steinberg | H04N 21/23424 725/34 |
| 2014/0180818 A1* | 6/2014 | Mistler | G06Q 30/0259 705/14.57 |
| 2014/0195675 A1* | 7/2014 | Silver | H04L 65/1083 709/224 |
| 2014/0282780 A1* | 9/2014 | Craib | H04N 21/4126 725/110 |
| 2014/0288686 A1 | 9/2014 | Sant et al. | |
| 2015/0319479 A1* | 11/2015 | Mishra | G06Q 30/0277 725/32 |
| 2016/0007052 A1* | 1/2016 | Haitsuka | H04N 21/2407 725/115 |
| 2016/0189249 A1* | 6/2016 | Meyer | G06Q 30/0277 705/14.66 |
| 2017/0264619 A1* | 9/2017 | Narayanaswamy | H04L 63/105 |

* cited by examiner

COORDINATING METGADATA

BACKGROUND

1. Technical Field

The present disclosure relates to inserting metadata into streaming media items and more specifically to inserting global metadata that can be used to obtain supplemental metadata for specific consumption experiences into a broadcast transmission of streaming media items.

2. Introduction

Internet transmissions of streaming media items; such as music media may include basic metadata such as a title or artist, but there is no solution for adequate metadata encoding for broadcast media over the Internet. Traditional broadcast media, such as terrestrial radio can include metadata associated with the broadcast media content through use of a radio data service. However, traditional broadcast is necessarily limited to a geographic region due to a broadcast range. Internet broadcasts which can go anywhere in the world are not limited to a broadcast range. Known solutions for adding metadata to a recorded or live stream of broadcast media over the Internet or wide-area network can involve an operator manually filling in metadata fields, or basic metadata. However, such mechanisms also do not contemplate broadcasts to diverse geographies, or if they do, the metadata is generic or specific to the device consuming the media. For example, metadata for a media item can be distinctive for different countries and an operator cannot custom prepare the metadata or individually deliver the metadata for client devices in all of the different countries consuming the broadcast media stream. Therefore, there is a need in the art for systems, methods, and non-transitory computer-readable storage media for coordinating global metadata that is used to obtain more specific metadata for specific consumption experiences.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for coordinating metadata for media coming from a broadcast streaming source so that the broadcast streaming media can be encoded with global metadata that is used to obtain more specific metadata for specific consumption experiences.

The present technology involves a metadata coordination engine that receives data from a broadcast media streaming source that identifies media items being streamed to client devices. The metadata coordination engine can store metadata for media items and can gather metadata from a database. After coordinating the metadata for the broadcast streaming media, the metadata coordination engine sends the metadata to an encoder that encodes the media content and metadata as a secure stream and distributes the same stream to every client.

In some embodiments of the present technology, the metadata coordination engine transmits global metadata to the encoder. While in some embodiments, global metadata can refer to metadata pertaining to many geographies, it is not limited to a geographical context. For example global metadata can refer to a collection of metadata that is relevant to many possible consumption experiences, while a subset of the global metadata can refer to metadata that is relevant to fewer, or even one, consumption experience. As explained above, in some embodiments, global metadata can refer to metadata relevant to consumption experiences in many markets (markets defined by geography) around the world, while a subset of the global metadata can refer to metadata relevant to a few, or even one specific market (market defined by geography). In some embodiments, global metadata can refer to metadata relevant to consumption experiences for many demographics, while a subset of the global metadata can refer to metadata relevant to a few, or even one, demographic.

The global metadata need not be a complete or exhaustive collection of metadata pertaining to a media item. While the global metadata includes metadata that pertains to at least two consumption experiences, there may be more detailed metadata that is specific to a single consumption experience. For example, as explained above, global metadata might include metadata identifying a media item in two different country-specific media item databases and a link to artwork representing the media item that not country specific. The subset of the global metadata can include metadata identifying the media item in one specific country.

As used herein "streaming media" "media streaming" or "broadcast streaming media" and similar terms refer to transmission of the same media stream to multiple users, but does not necessarily imply a broadcast in the traditional sense that the stream is sent to every user on a network. Rather "broadcast" refers to multiple clients receiving the same stream that can be transmitted specifically to those clients. For example 100 client devices around the world can request access to a media stream, and each of the 100 client devices can be sent the same media stream.

The present technology can involve a method of providing specific metadata to client devices using a metadata coordination engine to gather and transmit global metadata for a media item that is currently playing in a media stream. The method can involve receiving data from a media-streaming source that identifies a media item that is currently being streamed and gathering global metadata for the media item and sending the global metadata to an encoder for being encoded into a secure stream. A client device can receive a media stream encoded with global metadata and extract metadata specific to the client device's particular consumption experience (e.g. a geographical location of a store associated with the client device.) The client device can extract and use that portion of global metadata specific to the client device's particular consumption experience to request supplemental metadata that is more closely relevant to the client device's particular consumption experience.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for coordinating metadata. Systems, methods and non-transitory computer-readable media are disclosed which coordinate metadata for media coming from a streaming source so that the streaming media can be encoded with global metadata that is used to obtain more specific metadata for specific consumption experiences.

Figure 1:
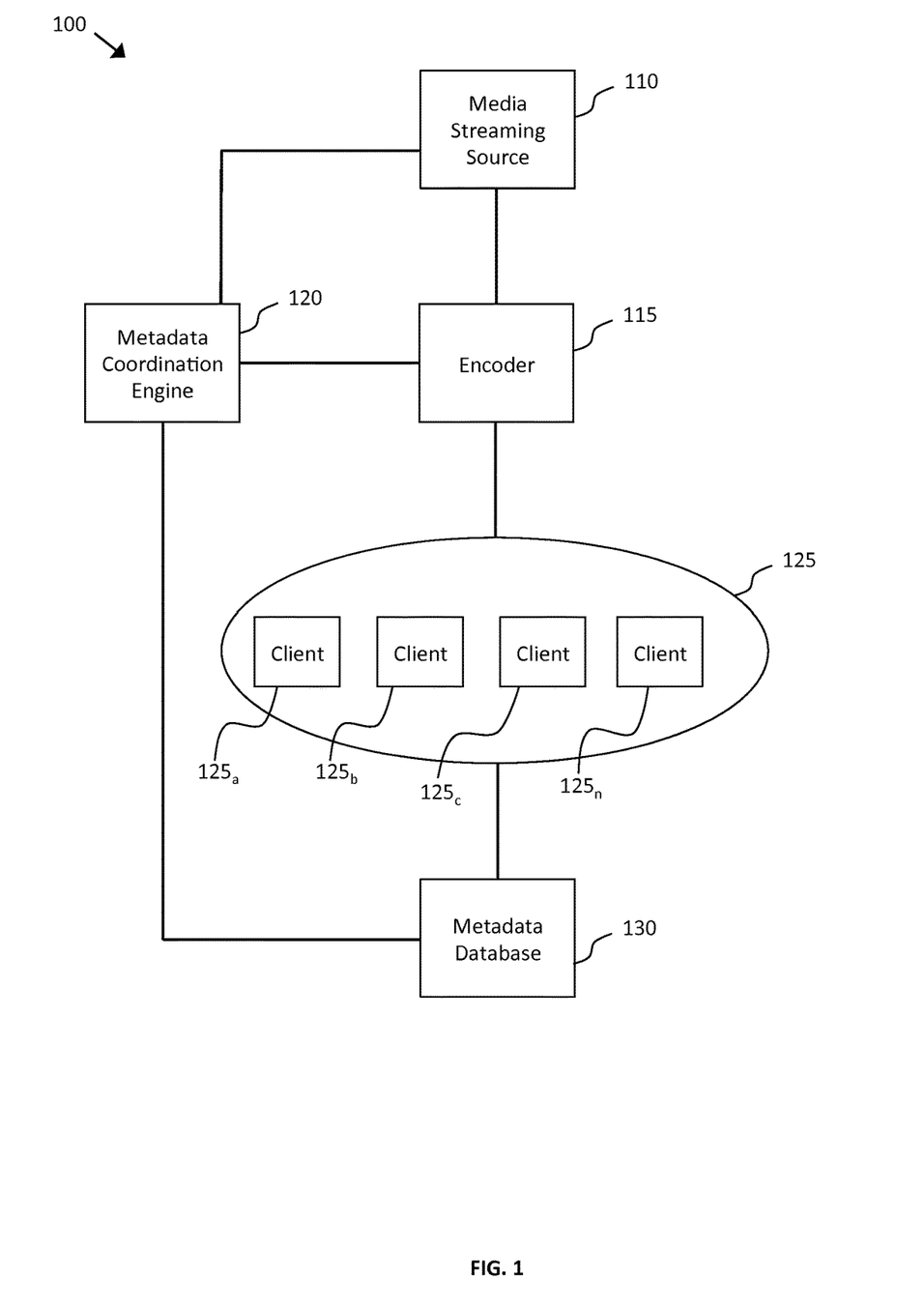
FIG. 1 illustrates an example system for coordinating metadata according to some embodiments of the present technology.

FIG. 1 illustrates a system 100 for coordinating metadata according to some embodiments of the present technology. The system 100 includes a media streaming source 110 communicating with an encoder 115 and a metadata coordination engine 120. The encoder 115 can receive media item content streamed from the media streaming source 110 and encode the media content for playback on one or more client devices $125_a$, $125_b$, $125_c$, ..., $125_n$ from a group of client devices 125.

The media streaming source 110 can maintain media files, mix media, incorporate programming, and output a stream of media items. As explained in greater detail below, the media streaming source 110 can also receive programming information from another source.

The media streaming source 110 sends a media output to the encoder 115. Additionally, the media streaming source 110 can communicate with the metadata coordination engine 120. The media streaming source 110 also sends data that can be used by the metadata coordination engine 120 to identify the currently streaming media item. For example, the media streaming source 110 can send basic metadata (e.g. song name or song identifier) to the metadata coordination engine 120 for identifying the media item currently being streamed. In some embodiments, the metadata coordination engine 120 periodically receives the data from the media streaming source 110 and updates the identification of the streaming media as the stream progresses.

In some embodiments, the metadata coordination engine 120 can maintain a master collection of metadata for media items. For example, the metadata coordination engine 120 can maintain metadata such as a media item's store identifier, content type, provider identifier, vendor identifier, title, album, artist name, cover art, country identifier, etc. When the metadata coordination engine 120 receives the identification of a currently streaming media item from the media streaming source 110, it can send metadata relevant to the currently streaming media item to the encoder 115 to be encoded into a broadcast stream along with the media output from the media streaming source 110 to be streamed to client devices $125_a$, $125_b$, $125_c$, ..., $125_n$.

The metadata coordination engine 120 can also request metadata for the media items being streamed by the media streaming source 110 from a metadata database 130. For example, when the metadata coordination engine 120 receives the identification of a currently streaming media item from the media streaming source 110, it can send the identification to the metadata database 130 and receive metadata relevant to the currently streaming media item in response. Next, the metadata coordination engine 120 transmits the metadata relevant to the currently streaming media item received from the metadata database 130 to the encoder 115 to be encoded into a broadcast stream along with the media output from the media streaming source 110 to be streamed to client devices $125_a$, $125_b$, $125_c$, ..., $125_n$.

Additionally, in some embodiments of the present technology, the metadata coordination engine 120 can receive metadata from a metadata customization engine 116 and replace the existing metadata delivered by the media streaming source 110, the metadata database 130, or both. The metadata customization engine 116 can include a user interface for allowing a user to define metadata for a currently streamlining media item.

Figure 2:
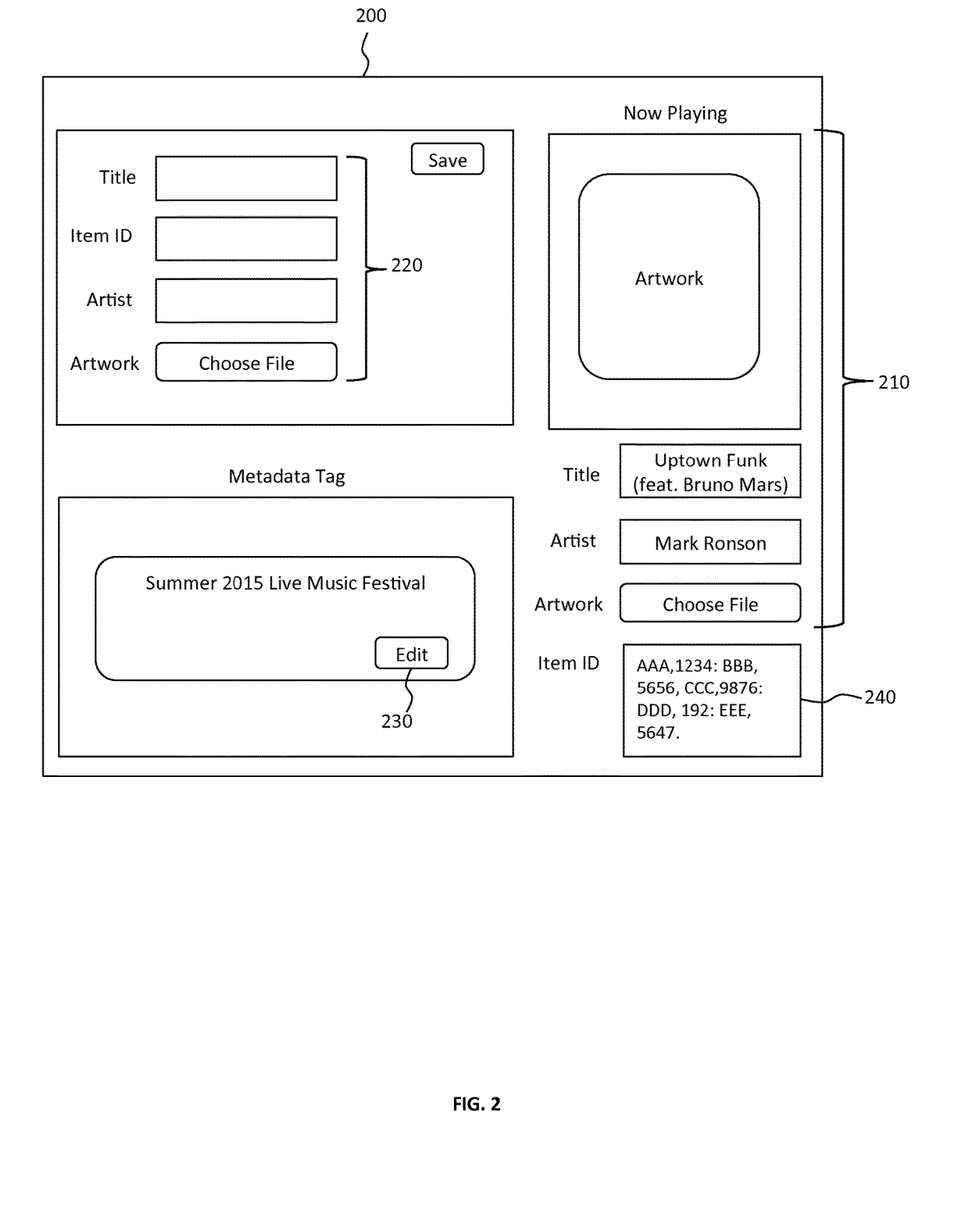
FIG. 2 illustrates an example interface for managing metadata using a metadata coordination engine according to some embodiments of the present technology.

FIG. 2 illustrates an example of an interface 200 for managing metadata using the metadata customization engine according to some embodiments of the present technology. As shown, an interface 200 includes fields for metadata 210 identifying a currently playing media item and tools 220 for creating a new metadata tag and an interface element 230 to edit the existing metadata tag.

The metadata coordination engine 120 can use the data identifying a currently playing media item to request additional metadata 130 from a metadata database. For example, the metadata database 130 can use basic data to retrieve global metadata for the media item and provide the global metadata to the metadata coordination engine for broadcast to the client devices $125_a$, $125_b$, $125_c$, ..., $125_n$. As will be discussed in greater detail below, global metadata can refer to system-wide metadata that can be used by a client device 125 to retrieve a more specific metadata.

FIG. 2 shows an example of global metadata 240 received from a metadata database. The global metadata 240 can include a plurality of store identifiers and media item identifiers that identify a media item, as it exists in a plurality of stores. For example, a plurality of country-specific storefronts can provide versions of metadata for the same media item to client devices and the client devices can obtain a version of the media item depending on the country the client device is associated with. The metadata coordination engine can send the entire collection of global metadata 240 to all requesting client devices and the individual client devices can extract storefront-specific metadata to request their country-specific version of the metadata for the media item.

Depending on variables, the client devices receiving streamed media can have a different of consumption experiences relevant to the way the media is presented or consumed. For example, a media item streamed to two client devices each in different countries can be displayed with artwork specific to the music store of that country (e.g. artwork from an album containing a streaming song can be available in a media store in Country A while an alternative version of the artwork is available in a media store in Country B). Also, a client device can indicate that a user belongs to a certain demographic and the streaming media can be presented in a way that is tailored to the user's demographic. For example, a user that is in a "Child" demographic can receive a censored version of metadata while a user in an "Adult" demographic can receive an explicit version of the metadata.

Furthermore, a client device's consumption experience can influence other aspects of a streaming media system. For example, a client device can send and a reporting system can receive information about a consumption experience relating to where a media item was consumed, what demographic consumed the media item, how long the media item was played, whether the media item was skipped, favorited, played to completion, etc. This information can be sent to a royalty service, a provider of invitational content, etc.

Referring again to FIG. 1, the metadata coordination engine 120 can transmit global metadata for the media item currently being streamed by the media streaming source 110 to the encoder, which can encode the media and metadata into a stream and broadcast the encoded stream to the client devices $125_a$, $125_b$, $125_c$, . . . , $125_n$. The client devices $125_a$, $125_b$, $125_c$, . . . , $125_n$ can extract a subset of the global metadata that is specific to a consumption experience associated with the client device. For example, a client device 125 can receive global metadata for a media item that includes media item identifiers for the media item, as it exists in various media stores in different geographic regions.

From the global metadata, the client device 125 can extract the media item identifier specific to their consumption experience. For example, an online music store can have regional or geographic counterparts and the media item identifier can indicate the regional or geographic counterpart for that client device. In some embodiments, the client device can send the more specific media item identifier to the metadata database 130 and request metadata that is specific to their consumption experience. For example, when the global metadata is transmitted with default artwork, the client device can extract a media item identifier that is specific to the country associated with the client device. The client can use the specific media identifier to request artwork specific to its country and display that artwork instead of the default artwork.

While in some embodiments, global metadata can refer to metadata pertaining to many geographies, it is not limited to a geographical context. For example global metadata can refer to a collection of metadata that is relevant to many possible consumption experiences, while a subset of the global metadata can refer to metadata that is relevant to fewer, or even one, consumption experience. As explained above, in some embodiments, global metadata can refer to metadata relevant to consumption experiences in many markets (markets defined by geography) around the world, while a subset of the global metadata can refer to metadata relevant to a few, or even one specific market (market defined by geography). In some embodiments, global metadata can refer to metadata relevant to consumption experiences for many demographics, while a subset of the global metadata can refer to metadata relevant to a few, or even one, demographic.

The global metadata need not be a complete or exhaustive collection of metadata pertaining to a media item. While the global metadata includes metadata that pertains to at least two consumption experiences, there may be more detailed metadata that is specific to a single consumption experience. For example, as explained above, global metadata might include metadata identifying a media item in two different country-specific media item databases and a link to artwork representing the media item that not country specific. The subset of the global metadata can include metadata identifying the media item in one specific country.

Also, a client device using the subset of the global metadata can potentially request supplemental metadata specific to the consumption experience, such as artwork specific to the country that may be different than the artwork representing the media item that not country specific.

Figure 3:
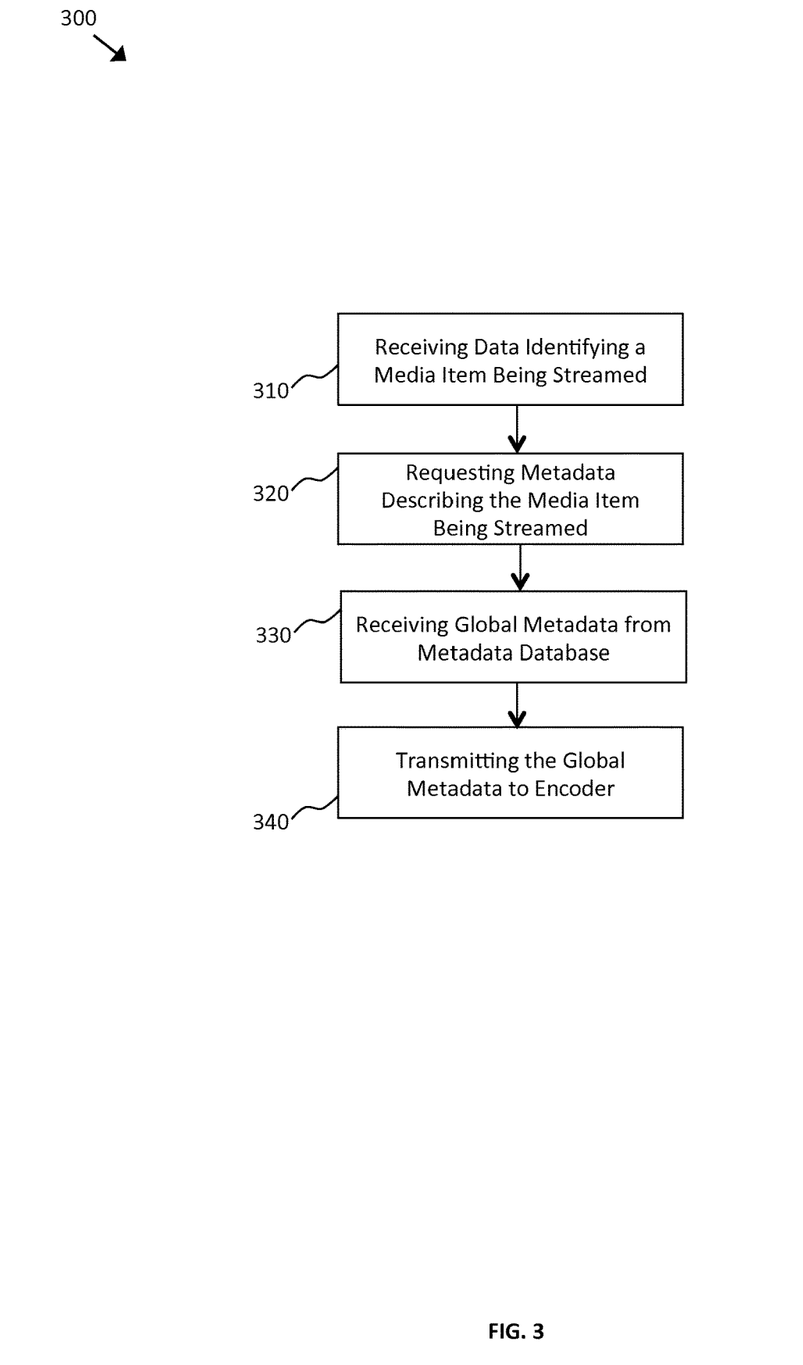
FIG. 3 illustrates an example method of transmitting global metadata describing a media item currently being streamed by a media streaming source according to some embodiments of the present technology.

FIG. 3 illustrates a method 300 of a metadata coordination engine transmitting global metadata describing a media item currently being streamed by a media streaming source according to some embodiments of the present technology. The method 300 involves receiving data identifying a media item being streamed 310 from a media streaming source. In some embodiments, the data identifying a media item can be a portion of metadata sufficient to identify the media. For example, the metadata coordination engine can receive an artist's set list from a curator of a live music festival and identify media items based on the information from the set list. Also, the data identifying the media item can involve using recognition software for analyzing a sample of the media item and using a fingerprint to compare to a database of media items to find a match.

Next, the method 300 can involve requesting metadata from a metadata database 320 for the identified media item and receiving global metadata 330 and transmitting the global metadata to an encoder 340 for being encoded into a secure stream that includes the media item being streamed and the global metadata. The global data can include one or more subset of the global metadata that is specific to a consumption experience associated with a client device and the client devices can request supplemental data specific to the consumption experience. For example, the global metadata can include specific media store identifiers specific to a plurality of geographic regions such that a client device consuming the media being streamed in a specified geographic location can extract the specific media store identifier for the location and request supplemental data specific to the location (e.g. geographic specific artwork).

In addition to the consumption experience being used to extract metadata specific to the consumption experience from global metadata, the consumption experience for the client devices can be considered when reporting when and how information about a media item was consumed to a reporting system.

Figure 4:
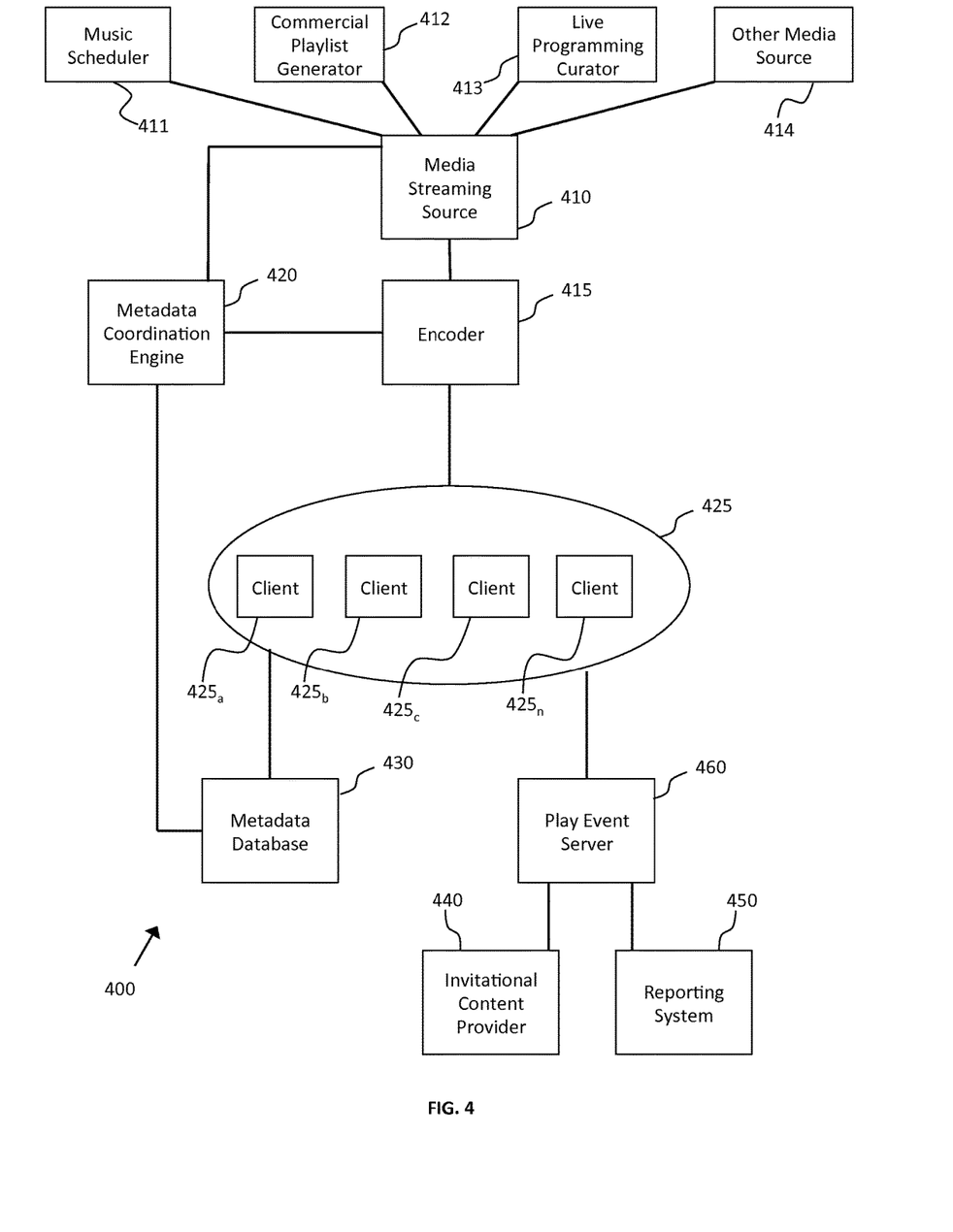
FIG. 4 illustrates an example system for providing data to a reporting system based on a consumption experience according to some embodiments of the present technology.

FIG. 4 illustrates a system 400 for providing data to a reporting system 450 based on a consumption experience according to some embodiments of the present technology. The system includes a media streaming source 410 that can maintain media files, mix media, incorporate programming, and output a stream of media items. In some embodiments, the media streaming source 410 can receive programming information from one or more music scheduler 411, commercial playlist generator 412, live programming curator 413, or other source 414.

Additionally, the media streaming source 410 can communicate with the metadata coordination engine 420. The media streaming source 410 sends a media output to the encoder 415 and identifies the media items to the metadata coordination engine 420 that stores metadata for media items and can request additional metadata from a metadata database 430. The metadata coordination engine 420 receives metadata associated with the media item and transmits the metadata for the media item being streamed to the encoder 415 to be encoded along with the media output from the media streaming source 410 and broadcast to one or more client devices $425_a$, $425_b$, $425_c$, . . . , $425_n$ from a group of client devices 425.

In some embodiments of the present technology, the client devices 425 can also communicate with a play event server 460 that is configured to receive data about how media items are consumed on the client devices 425. A client device 425 can send, to the play event server 460, information about a consumption experience relating to where a media item was played, what demographic played the media item, how long the media item was played, what percent of the media item was played, whether the media item was skipped, favorited, played to completion, etc. The play event server 460 can also send this consumption data to a third party, such as a reporting system 450 or an invitational content provider 440. The reporting system 450 can use the consumption data to generate consumption reports, analyze the reach or effectiveness of particular programming, determine how to account and distribute royalties due to content providers and arts, etc. The invitational content provider 440 can use the consumption data to select invitational content (e.g. promotional content, coupons, special offers, etc.) to send to the client devices 125.

Figure 5:
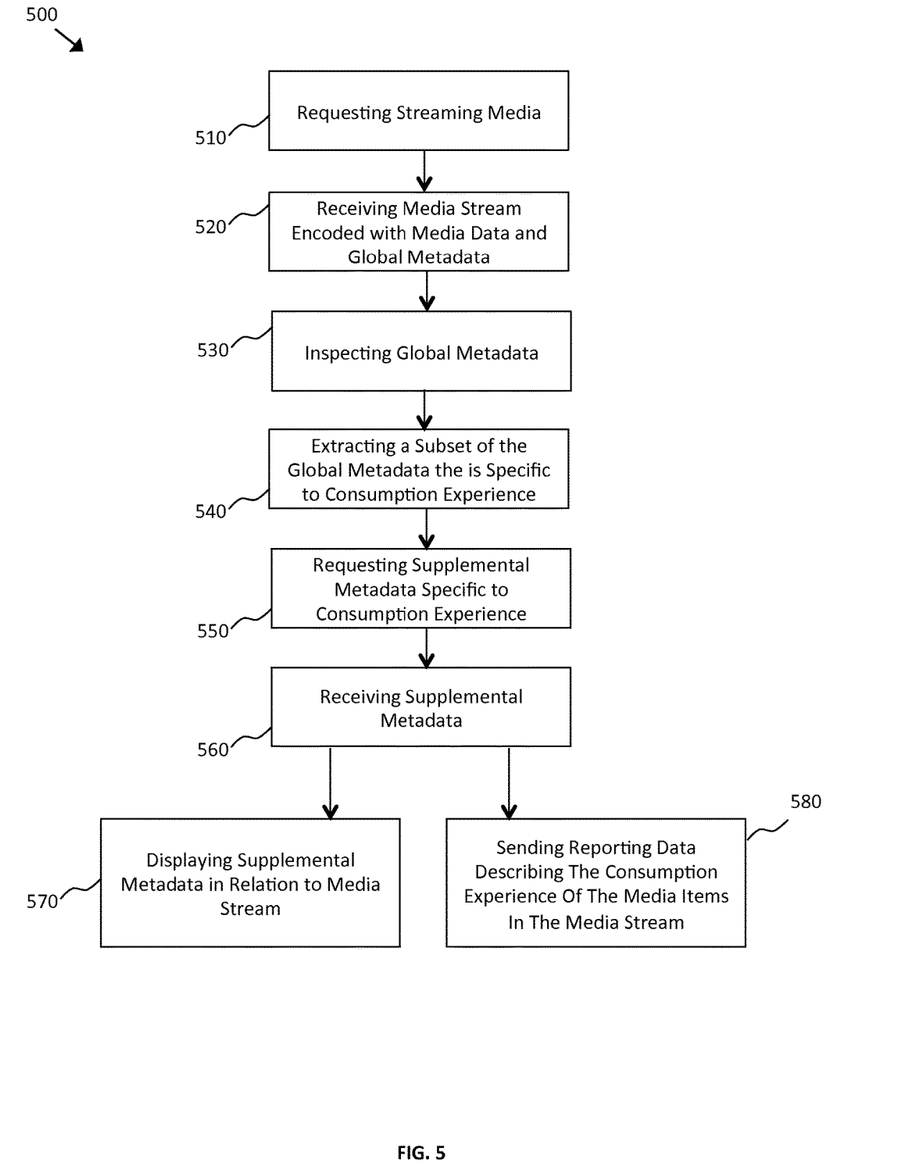
FIG. 5 illustrates an example method for outputting media from a media stream along with metadata specific to the consumption experience in which the media is consumed and for reporting consumption data according to some embodiments of the present technology.

FIG. 5 illustrates a method 500 for outputting media from a media stream along with metadata specific to the consumption experience in which the media is consumed and for reporting consumption data according to some embodiments of the present technology.

The method 500 involves a client device requesting streaming media 510 from a media streaming source and receiving a media stream that is encoded with the media data itself and with global metadata 520. Next, the method 500 involves the client device inspecting the global metadata 530, extracting a subset of the global metadata 540 that is specific to a particular consumption experience, and requesting supplemental data specific to the consumption experience 550. For example, the client device can inspect the global metadata and extract metadata describing where to find metadata that is specific to their consumption of the media. The client can then request supplemental data (e.g. metadata in a different language) based on how the media will be consumed (e.g. determining that the device is associated with a different language).

The method 500 involves receiving the supplemental data 560 and displaying the supplemental data 570 in relation to the media stream. Also, the method 500 involves sending reporting data describing the consumption experience of the media items in the media stream 580 to a reporting system based on the consumption experience. In some embodiments, the reporting data can be used to track royalties owed to parties (e.g. artists, labels, etc.)

Figure 6A:
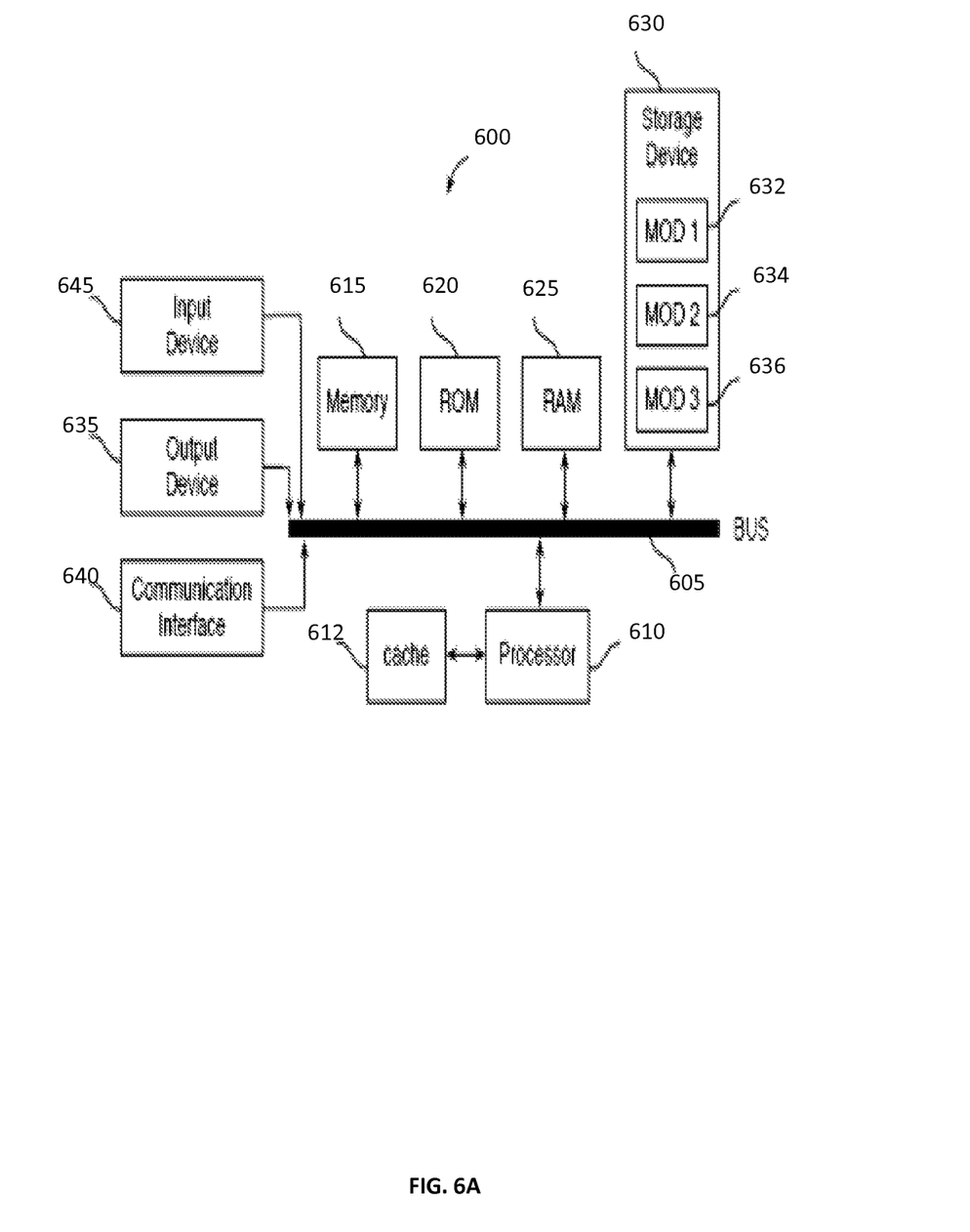
FIG. 6A and FIG. 6B illustrate example system embodiments.
Figure 6B:
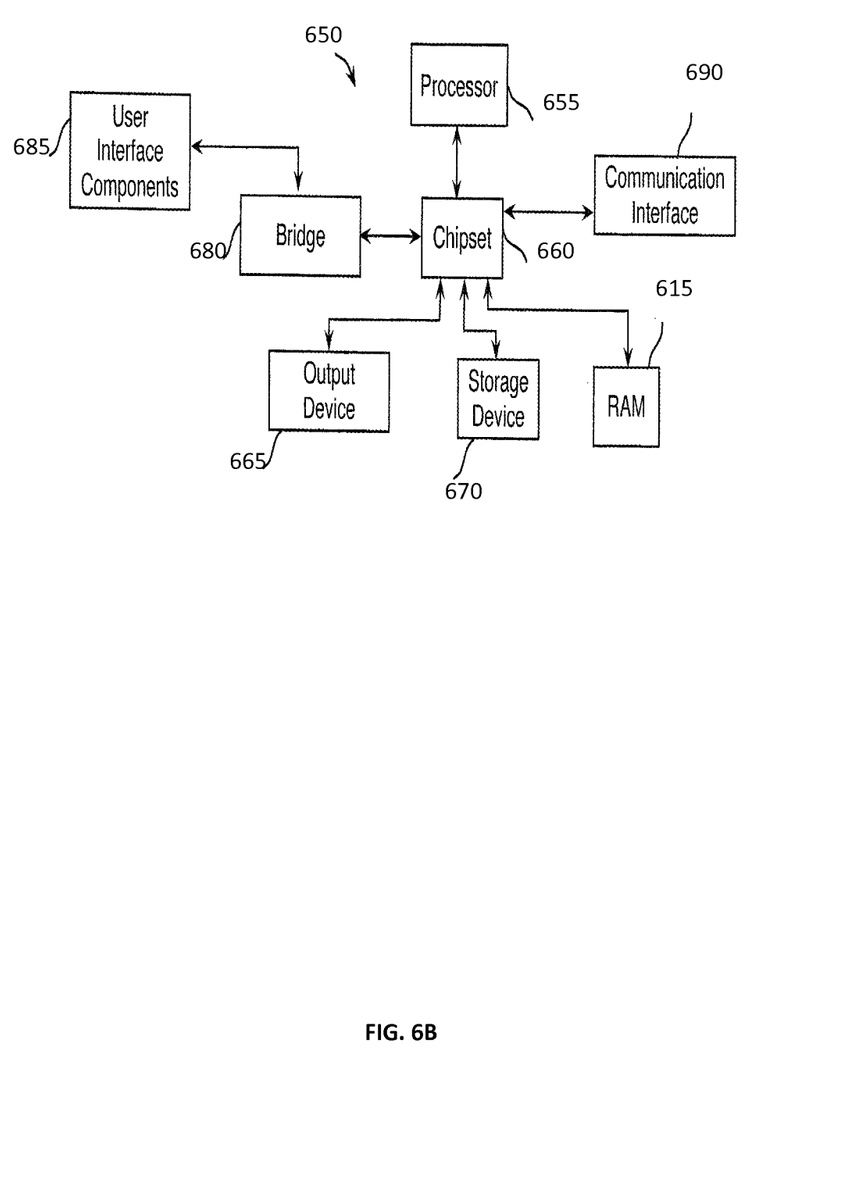

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:
1. A system comprising:
at least one processor; and
at least one memory device coupled to the at least one processor and comprising instructions which, when executed by the at least one processor, cause the at least one processor to:
receive data from a media streaming source configured to stream a plurality of media items,
receive, from a metadata coordination engine, metadata corresponding to a media item of the plurality of media items, wherein the metadata comprises a plurality of geographic location-specific consumption experiences, wherein each of the plurality of geographic location consumption experiences comprises presentation information associated with the media item for a particular geographic location,
encode a secure stream including the media item and the metadata corresponding to the media item, and
send the secure stream to two or more client devices,
wherein presentation of the media item is customized for a first client device of the two or more client devices based on a first geographic location-specific consumption experience for a geographic location of the first client device from the metadata, and
wherein presentation of the media item is customized for a second client device of the two or more client devices based on a second geographic location-specific consumption experience for a geographic location of the second client device from the metadata.

2. The system of claim 1, wherein a metadata database provides the metadata for the media item to the metadata coordination engine.

3. The system of claim 1, wherein the system receives one or more requests for supplemental data specific to the geographic location-specific consumption experience.

4. A computer-implemented method comprising:
receiving data from a media-streaming source that identifies a media item being streamed;
retrieving metadata corresponding to the media item being streamed, wherein the metadata comprises a plurality of geographic location-specific consumption experiences, wherein each of the plurality of geographic location consumption experiences comprises presentation information associated with the media item for a particular geographic location; and
transmitting, to an encoder, the metadata corresponding to the media item being streamed for being encoded into a secure stream that includes the media item being streamed and the metadata,
wherein presentation of the media item for a first client device of two or more client devices is customized based on a first geographic location-specific consumption experience for a geographic location of the first client device, and
wherein presentation of the media item for a second client device of the two or more client devices is customized based on a second geographic location-specific consumption experience based on a geographic location of the client device.

5. The computer-implemented method of claim 4, wherein retrieving metadata corresponding to the media item being streamed further comprises sending a request for the metadata corresponding to the media item being streamed to an external metadata database.

6. The computer-implemented method of claim 4, further comprising receiving one or more supplemental data requests specific to the first and second geographic location-specific consumption experiences.

7. A computer-implemented method comprising:
receiving, in a client device, a media stream encoded with media data and global metadata describing the media data, wherein the global metadata includes one or more subsets of the global metadata that is specific to a plurality of geographic location-specific consumption experiences, each geographic location-specific consumption experience comprising presentation information associated with the media data for a particular geographic location;
selecting, from the global metadata, a particular geographic location-specific consumption experience for the client device based on a geographic location of the client device;
transmitting data describing playback of the particular geographic location-specific consumption experience to a metadata database along with a request for supplemental data specific to the particular geographic location-specific consumption experience;
receiving, from the metadata database, the supplemental data; and
outputting the media data in accordance with the particular geographic location-specific consumption experiences and the supplemental data.

8. The computer-implemented method of claim 7, further comprising:
transmitting the data describing the particular geographic location-specific consumption experience to a consumption event system configured to provide reporting data describing the particular geographic location-specific consumption experience.

9. The computer-implemented method of claim 8, wherein the data describing the particular geographic location-specific consumption experience comprises a geographic location identifier for a media store associated with the client device.

10. The computer-implemented method of claim 8, wherein the data describing the playback of the particular geographic location-specific consumption experience comprises a demographic associated with the client device.

11. The computer-implemented method of claim 8, wherein the data describing playback of the particular geographic location-specific consumption experience comprises a description of a percent of a media item in the media stream that was skipped.

12. The computer-implemented method of claim 8, wherein the data describing playback of the particular geographic location-specific consumption experience comprises a description of a percent of a media item in the media stream that was played.

13. The computer-implemented method of claim 8, wherein the data describing playback of the particular geographic location-specific consumption experience comprises a description that a media item in the media stream was played to completion.

14. The computer-implemented method of claim 8, wherein the data describing playback of the particular geographic location-specific consumption experience comprises a description that a media item in the media stream was marked as being liked by a user of the client device.

15. A non-transitory computer-readable storage medium comprising instructions stored thereon which, when executed by at least one computing device, cause the at least one computing device to:
receive data from a media-streaming source that identifies a media item being streamed;
send, to an external metadata database, a request for metadata corresponding to the media item being streamed;
receive, from the external metadata database, global metadata corresponding to the media item being streamed in response to the request, wherein the global metadata comprises a plurality of geographic location-specific consumption experiences, wherein each of the plurality of geographic location consumption experiences comprises presentation information associated with the media item for a particular geographic location;
transmit, to an encoder, the global metadata corresponding to the media item being streamed for being encoded into a secure stream that includes the media item being streamed; and,
send, to two or more client devices, the secure stream, wherein presentation of the media item being streamed for a first client device of two or more client devices is customized based on a first geographic location-specific consumption experience for a geographic location of the first client device, and
wherein presentation of the media item for a second client device of the two or more client devices is customized based on a second geographic location-specific consumption experience for a geographic location of the client device.

* * * * *

UNITED STATES PATENT AND TRADEMARK OFFICE
CERTIFICATE OF CORRECTION

| | | |
|---|---|---|
| PATENT NO. | : 10,462,236 B2 | Page 1 of 1 |
| APPLICATION NO. | : 14/727724 | |
| DATED | : October 29, 2019 | |
| INVENTOR(S) | : Daniel E. Marusich et al. | |

It is certified that error appears in the above-identified patent and that said Letters Patent is hereby corrected as shown below:

On the Title Page

In Item (54): Replace the phrase "COORDINATING METGADATA" with the phrase --COORDINATING METADATA--.

Signed and Sealed this
Fourth Day of February, 2020

Andrei Iancu
*Director of the United States Patent and Trademark Office*